United States Patent [19]

Heitz et al.

[11] Patent Number: 5,736,596
[45] Date of Patent: Apr. 7, 1998

[54] USE OF THERMOPLASTIC ELECTROLUMINESCENT MATERIALS WHICH ARE STABLE FOR AN EXTENDED PERIOD

[75] Inventors: Thomas Heitz, Dannstadt-Schauernheim; Sylke Haremza, Neckargemünd; Andreas Greiner, Marburg, all of Germany

[73] Assignee: BASF Aktiengesellschaft, Ludwigshafen, Germany

[21] Appl. No.: 714,491

[22] Filed: Sep. 16, 1996

Related U.S. Application Data

[63] Continuation of Ser. No. 518,716, Aug. 24, 1995, abandoned.

[30] Foreign Application Priority Data

Aug. 26, 1994 [DE] Germany .......................... 44 30 288.6

[51] Int. Cl.⁶ ........................ C09K 11/02; H05B 33/14
[52] U.S. Cl. .................. 524/90; 524/92; 428/690; 428/917; 252/301.35
[58] Field of Search .............. 524/90, 92; 428/917; 252/301.35

[56] References Cited

U.S. PATENT DOCUMENTS

| | | | |
|---|---|---|---|
| 3,969,302 | 7/1976 | Wegmann | 524/87 |
| 4,492,648 | 1/1985 | Claussen | 524/90 |
| 4,769,460 | 9/1988 | Spietschka et al. | 524/90 |
| 5,104,918 | 4/1992 | Bäbler | 524/90 |
| 5,443,921 | 8/1995 | Hosokawa et al. | 428/917 |
| 5,458,977 | 10/1995 | Hosokawa et al. | 428/917 |
| 5,470,502 | 11/1995 | Hahn | 252/301.35 |

FOREIGN PATENT DOCUMENTS

| | | |
|---|---|---|
| 438 882 | 7/1991 | European Pat. Off. . |
| 657 436 | 11/1994 | European Pat. Off. . |
| 40 18 830 | 6/1990 | Germany . |
| 43 38 784 | 11/1993 | Germany . |

OTHER PUBLICATIONS

"Principles of Polymer Chemistry" by Paul J. Flory, pp. 52–53, Cornell Univ. Press, 1971.

Abstract JP 4/212 286.

Abstract JP 4/188 597.

Abstract JP 5320 634.

Abstract JO 2285–516.

J. Appl. Phys. vol. 31 (1992) Pt. 1, No. 6, pp. 108–112.

*Primary Examiner*—Tae Yoon
*Attorney, Agent, or Firm*—Keil & Weinkauf

[57] ABSTRACT

A process for the production of a molding, fiber or film which can be caused to fluoresce by an electrical voltage which comprises using linear mixtures comprising a fluorescent dye from the perylene series and a thermoplastic polymer having a degree of crystallinity of less than 10%.

6 Claims, No Drawings

USE OF THERMOPLASTIC ELECTROLUMINESCENT MATERIALS WHICH ARE STABLE FOR AN EXTENDED PERIOD

This application is a continuation of application Ser. No. 08/518,716, filed on Aug. 24, 1995 now abandoned

BACKGROUND OF THE INVENTION

1. Field of the Invention

The present invention relates to a process for the production of a molding, fiber or film which can be caused to fluoresce by an electrical voltage using binary mixtures comprising a fluorescent dye from the perylene series and a thermoplastic polymer having a degree of crystallinity of less than 10%.

2. Description of the Prior Art

Known organic electroluminescent materials, ie. materials which can be caused to fluoresce by an electrical voltage, include low-molecular-weight fluorescent dyes. These are generally used in the form of multilayer arrangements or are embedded in an inert polymer matrix. However, a low-molecular-weight, hole-conducting substance (p-conductor) is always added in order to achieve the desired properties (cf., for example, J. Appl. Phys. 31, (1992) 108 and JP-A 04-212286, JP-A 04-188 597 and JP 05-320634).

Multilayer arrangements have hitherto generally been produced in a relatively complex manner by vapor-deposition of the emitter materials and the hole-conducting, low-molecular-weight compounds. This process is limited on the one hand by the need for the emitter materials and the hole-conducting additives to be volatile, and on the other hand by the complexity involved in applying various layers.

In addition, mixtures of low-molecular-weight emitter materials and low-molecular-weight hole-conducting structures are frequently not completely satisfactory with respect to the stability of their morphology.

Low-molecular-weight materials embedded in polymer systems tend to migrate; this effect is more pronounced in ternary systems than in binary systems, which is likewise disadvantageous for the long-term stability of the morphology.

It is an object of the present invention to provide electroluminescent, thermoplastic materials for use in the production of components, moldings, films or fibers which can be caused to fluoresce by an electrical voltage, which materials are firstly accessible by a simple process and secondly have good long-term stability of their morphology.

SUMMARY OF THE INVENTION

We have found that this object is achieved by using a binary mixture comprising a fluorescent dye from the perylene series and a thermoplastic polymer have a degree of crystallinity of less than 10% for the production of a molding, fiber or film which can be caused to fluoresce by an electrical voltage.

Suitable fluorescent dyes from the perylene series are generally those built up from perylenetetracarboxylic acid, benzanthrone, dibenzanthrone or isodibenzanthrone (isoviolanthrone).

Corresponding products are known to the person skilled in the art and are described in the literature.

DESCRIPTION OF THE PREFERRED EMBODIMENTS

Particular preference is given to fluorescent dyes of the formulae I to III

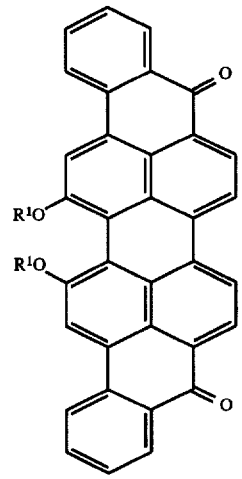

I

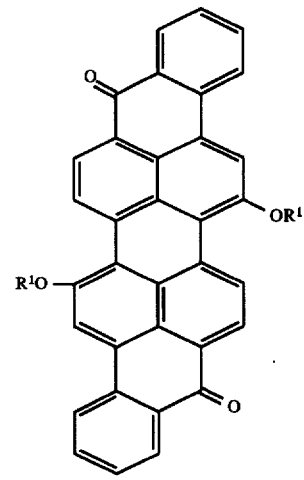

I'

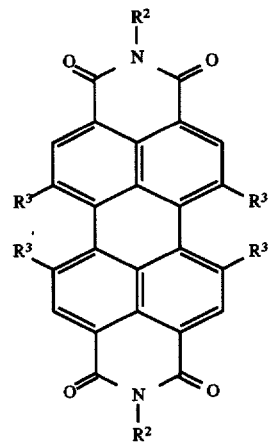

II

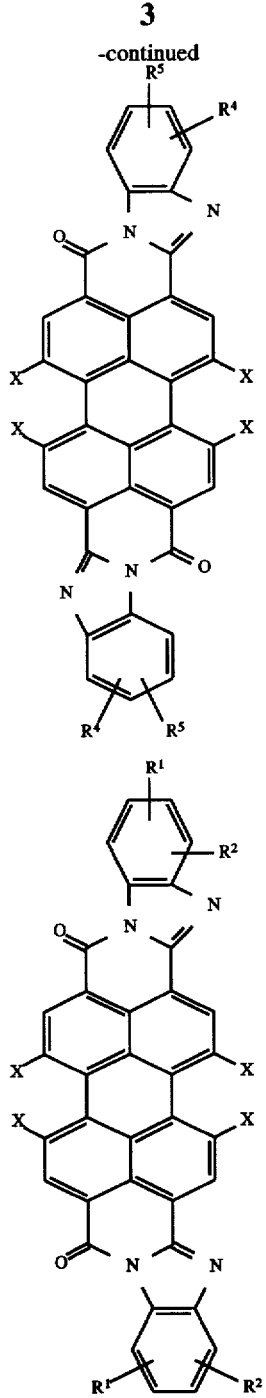

where
- $R^1$ is $C_1$–$C_{13}$-alkyl, $C_1$–$C_{13}$-acyl, or $SO_2R$ where R is phenyl or $C_1$–$C_{13}$-alkyl-substituted phenyl
- $R^2$ is $C_5$–$C_{20}$-alkyl, which may be interrupted by an oxygen atom, or is phenyl, which is monosubstituted or polysubstituted by $C_1$–$C_{13}$-alkyl or $C_1$–$C_{13}$-alkoxy,
- $R^3$ is hydrogen, chlorine, phenoxy or halogen-, $C_1$–$C_4$-alkyl- or $C_1$–$C_4$-alkoxy-substituted phenoxy,
- $R^4$ and $R^5$, independently of one another, are hydrogen, $C_1$–$C_{20}$-alkyl, $C_1$–$C_{20}$-alkoxy or phenoxy and X is hydrogen, halogen or $OR^6$, where $R^6$ is phenyl or $C_1$–$C_{13}$-alkyl- or $C_1$–$C_{13}$-alkoxy-substituted phenyl.

Particular preference is given to fluorescent dyes of the formula II in which $R^2$ is phenyl which is monosubstituted or polysubstituted by $C_1$–$C_4$-alkyl or $C_1$–$C_4$-alkoxy, and $R^3$ is hydrogen, phenoxy or chlorine.

Very particular emphasis should furthermore be placed on fluorescent dyes of the formula II in which $R^2$ is 2,6-diisopropylphenyl, and $R^3$ is phenoxy.

Examples of suitable radicals $R^1$ are methyl, ethyl, propyl, isopropyl, butyl, isobutyl and sec-butyl.

Examples of radicals $R^2$ are pentyl, isopentyl, neopentyl, tertpentyl, hexyl, 2-methylpentyl, heptyl, 1-ethylpentyl, octyl, 2-ethylhexyl, isooctyl, nonyl, isononyl, decyl, isodecyl and undecyl.

Further examples of radicals $R^1$ and $R^2$ are dodecyl, tridecyl and isotridecyl.

Further examples of radicals $R^2$ are tetradecyl, pentadecyl, hexadecyl, heptadecyl, octadecyl, nonadecyl, eicosyl (the above terms isooctyl, isononyl, isodecyl and isotridecyl are trivial terms and originate from the alcohols obtained by the oxosynthesis; in this respect, cf. Ullmanns Encyklopädie der technischen Chemie, 4th edition, Volume 7, pages 216 to 217, and Volume 11, pages 435 and 436), 2-propoxyethyl, 2-isopropoxyethyl, 2-butoxyethyl, 2- and 3-methoxypropyl, 2- and 3-ethoxypropyl, 2- and 3-propoxypropyl, 2- and 3-isopropoxypropyl, 2- and 3-butoxypropyl, 2- and 3-(2-ethylhexyloxy)propyl, 2- and 4-methoxybutyl, 2- and 4-ethoxybutyl, 2- and 4-propoxybutyl, 2- and 4-isopropoxybutyl, 2- and 4-butoxybutyl, 2- and 4-(2-ethylhexyloxy)butyl, 2-methyl-6-isopropylphenyl, 2-methyl-6-sec-butylphenyl, 2-methyl-6-tert-butylphenyl, 2-ethyl-6-isopropylphenyl, 2-ethyl-6-sec-butylphenyl, 2-ethyl-6-tert-butylphenyl, 2-methylphenyl, 2,3-, 2,4-, 2,5- and 2,6-dimethylphenyl, 2,4,6-trimethylphenyl, 2-methyl-4-methoxyphenyl, 2,5-dimethyl-4-methoxyphenyl, 2-ethylphenyl, 2,6-diethylphenyl, 2,6-diethyl-4-methylphenyl, 2-isopropylphenyl, 2,4-, 2,5- and 2,6-diisopropylphenyl, 2-n-butylphenyl, 2-sec-butylphenyl, 2-n-pentylphenyl, 2-n-hexylphenyl, 2-(2'-methylpentyl)phenyl, 2-n-octylphenyl, 2-methoxyphenyl, 2-ethoxyphenyl, 2,5-dimethoxyphenyl, 2,5-diethoxyphenyl, 2,4-dimethoxyphenyl, 2,4-diethoxyphenyl, 2,3-dimethoxyphenyl and 2,3-diethoxyphenyl.

Examples of radicals $R^3$ are 2-, 3- and 4-fluorophenoxy, 2-, 3- and 4-chlorophenoxy, 2-, 3- and 4-bromophenoxy, 2-, 3- and 4-tert-butylphenoxy, 2-isopropyl-4-methylphenoxy, 2,3-, 2,4-, 2,5- and 2,6-dichlorophenoxy, 2,4,5- and 2,4,6-trichlorophenoxy, 2-, 3- and 4-methylphenoxy, 2,3-, 2,4, 2,5-, 2,6- and 3,5-dimethylphenoxy, 2,5,6-trimethylphenoxy, 2-methyl-4-chlorophenoxy, 2-methyl-5-chlorophenoxy, 2-methyl-6-chlorophenoxy, 2-ethylphenoxy, 2,6-diethylphenoxy, 2,6-diethyl-4-methylphenoxy, 2-isopropylphenoxy, 3-methyl-4-chlorophenyl, 4-propylphenoxy, 4-butylphenoxy, 2-, 3- and 4-methoxyphenoxy, 2-, 3- and 4-ethoxyphenoxy, 2-, 3- and 4-propoxyphenoxy, 2-, 3- and 4-isopropoxyphenoxy, 2-, 3- and 4-butoxyphenoxy and 2,4-dimethoxyphenoxy.

With respect to suitable radicals $R^4$ and $R^5$, the statements made above for the radicals $R^1$ and $R^2$ or $R^3$ apply correspondingly.

It goes without saying that mixtures of a plurality of fluorescent dyes of the formula I, II and/or III can also be employed.

The proportion of the fluorescent dyes in the mixtures is generally in the range from 1 to 50% by weight, preferably from 5 to 30% by weight, based on the total weight of the mixtures.

The matrix present in the mixtures used in accordance with the invention is a thermoplastic polymer having a degree of crystallinity of less than 10%, in particular from 0 to 5%. Particular preference is given to amorphous polymers, in particular polyaryl (meth)acrylates, polyalkyl methacrylates, polystyrene (including copolymers with vinylic monomers), polyvinyl chloride, polyvinyl ether, polyvinyl esters, polyvinylpyrrolidone, polyvinylpyridine, and, from the group consisting of the polycondensates, polyalkyl arylates, for example polyethylene terephthalate, polybutylene terephthalate, polyethylene naphthalate and polybutylene naphthalate, polyarylates (for example polyesters based on bisphenol A/terephthalic and/or isophthalic acid), polycarbonates, polyaryl sulfones, polyaryl ether sulfones, polyimides, polyether imides and polyarylalkylsiloxanes.

In many cases, polymers from the group consisting of polyalkyl methacrylates, polyaryl methacrylates, copolymers of styrene with vinylic monomers, polyvinylpyrrolidone and the polycondensates have proven particularly advantageous.

For a number of applications, it is furthermore advantageous for the glass transition temperature of the polymers used to be above 130° C.

A very particularly preferred group of polymers comprises polycondensates having glass transition temperatures of above 130° C.

Corresponding polymers are commercially available and are described in the literature, and therefore further details in this respect are superfluous.

The binary mixtures to be used in accordance with the invention can be prepared either by simple mixing in the melt or alternatively by mixing in an inert solvent. Examples of suitable solvents are toluene, cyclohexane, hexane, octane, dichloromethane, trichloromethane, trichloroethane, fluorinated chloroalkanes, dimethylformamide, dimethylacetamide, dimethyl sulfoxide, N-methylpyrrolidone and tetrahydrofuran, to mention but a few examples.

Mixing in the melt is preferably carried out in a suitable mixing unit, in particular an extruder. It is essential that no low-molecular-weight hole conductors are present during preparation of the mixtures. In accordance with the invention, the binary mixtures described above are used for the production of components (moldings), fibers and/or films which can be caused to fluoresce by an electrical voltage.

Particular preference is given to electroluminescent devices in which the binary mixtures described above are introduced between two electrodes. After application of a voltage, luminescence is obtained from a certain minimum voltage; the color of the luminescence (wavelength) depends on the type of fluorescent dye used.

Anode/luminescent mixture/cathode arrangements of this type can now be produced in a multiplicity of various forms or introduced into components having any desired structure; for this reason, the binary mixtures described can be used as electroluminescent materials in a wide range of applications.

Particular advantages over multilayer arrangements or ternary dye/polymer/low-molecular-weight hole conductor mixtures known from the prior art are the ease of preparation (and thus also simple shaping) and the improved long-term stability owing to the absence of low-molecular-weight hole conductors.

EXAMPLES

Example 1

11.93 mg of N,N'-bis(2',6'-diisopropylphenyl)perylene-3,4,9,10-tetracarboximide were mixed with 47.70 mg of a polycarbonate based on bisphenol A/phosgene (Macrolon® 2800 from Bayer AG, reduced viscosity=0.6 dl/g, measured in 0.5% strength by weight solution in dichloromethane at 25° C.) and 4 ml of chloroform. The homogeneous solution obtained was applied to an indium/tin oxide (ITO) coated glass plate by spin coating, so that a transparent film having a thickness of 100 μm was obtained. Electrodes were attached to the ITO layer and to the polycarbonate/dye layer, and a voltage was applied, with the ITO layer being connected as the anode.

Yellow luminescence with an emission maximum at 595 nm was observed from a threshold voltage of 18 V.

Example 2

The procedure was similar to that in Example 1, but the dye in Example 1 was replaced by 11.93 mg of N,N'-bis(2,6-diisopropylphenyl)-1,6,7,12-tetraphenoxyperylene-3,4,9,10-tetracarboximide. Orange luminescence with an emission maximum at 618 nm was observed from a threshold voltage of 15 V.

We claim:

1. A process for the production of an electroluminescent molding, fiber or film, which comprises forming a binary mixture which consists essentially of a fluorescent dye containing a perylene group and a thermoplastic polymer having a degree of crystallinity of less than 10%, and then forming a molding, fiber or film from this binary mixture; and then applying an electrical voltage to the molding fiber or film until the molding, fiber or film fluoresces.

2. The process of claim 1, wherein the fluorescent dye is based on perylene tetracarboxylic acid, benzanthrone, dibenzanthrone or isodibenzathrone.

3. The process of claim 1, where the fluorescent dye has the formula I, I', II, III or III'

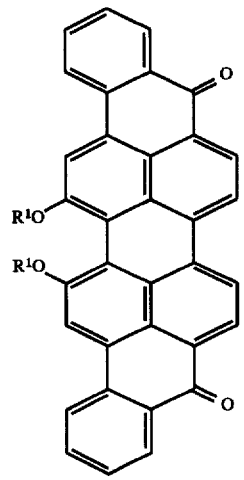

I

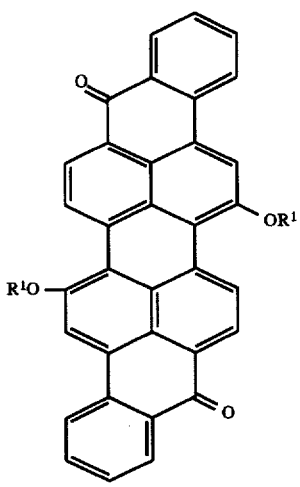

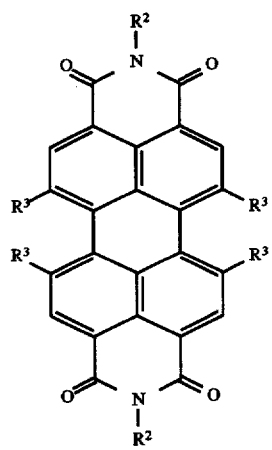

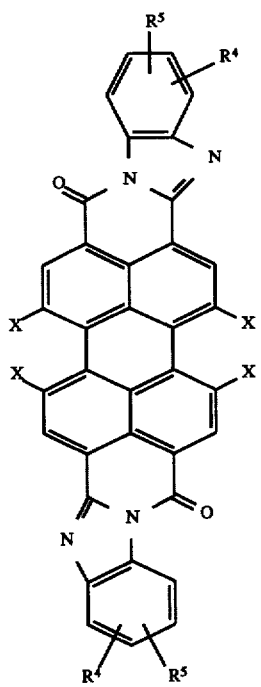

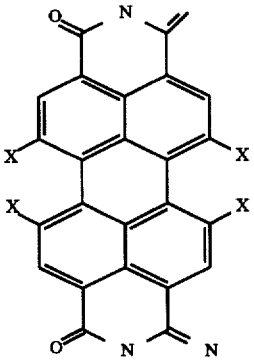

where

R¹ is $C_1$–$C_{13}$-alkyl, $C_1$–$C_{13}$-acyl, or $SO_2R$ where R is phenyl or $C_1$–$C_{13}$-alkyl-substituted phenyl, R² is $C_5$–$C_{20}$-alkyl, which may be interrupted by an oxygen atom, or is phenyl which is monosubstituted or polysubstituted by $C_1$–$C_{13}$-alkyl or $C_1$–$C_{13}$-alkoxy, R³ is hydrogen, chlorine, phenoxy or halogen-, $C_1$–$C_4$-alkyl- or $C_1$–$C_4$-alkoxy-substituted phenoxy, R⁴ and R⁵, independently of one another, are hydrogen, $C_1$–$C_{20}$-alkyl, $C_1$–$C_{20}$-alkoxy or phenoxy and X is hydrogen, halogen or OR⁶, where R⁶ is phenyl or $C_1$–$C_{13}$-alkyl- or $C_1$–$C_{13}$-alkoxy-substituted phenyl.

4. The process of claim 3, wherein the fluorescent dye has the formula II wherein R² is phenyl which is monosubstituted or polysubstituted by $C_1$–$C_4$-alkyl or $C_1$–$C_4$-alkoxy and R³ is hydrogen, phenoxy, or chlorine.

5. The process of claim 3, wherein the fluorescent dye has the formula II wherein R² is 2,6-diisopropyl phenyl and R³ is phenoxy.

6. The process of claim 1, wherein the polymer is a member selected from the group consisting of polyalkyl methacrylates, polyaryl methacrylates, copolymers of styrene with vinylic monomers, polyvinylpyrrolidone, polyalkyl acrylates, polyarylates, polycarbonates, polyaryl sulfones, polyaryl ether sulfones, polyimides, polyether imides, and polyarylalkyl siloxanes.

* * * * *